Feb. 19, 1946.   J. G. HOLMSTROM ET AL   2,395,183
TORSION-ROD SPRINGING OF TANDEM-AXLE VEHICLE
Filed July 24, 1944   3 Sheets-Sheet 1
Fig. 6.
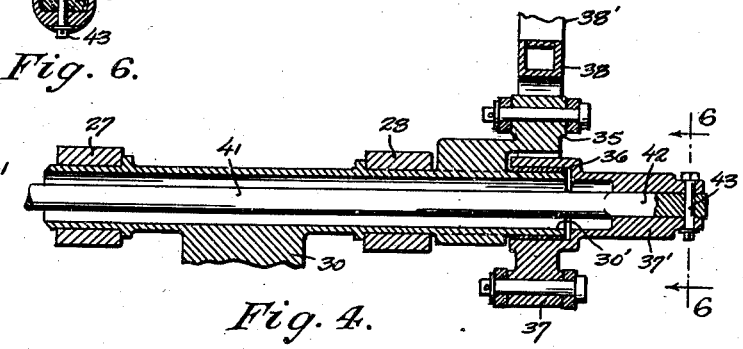
Fig. 5.   Fig. 4.
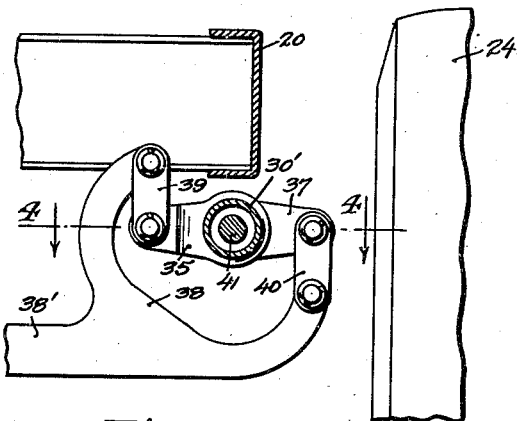
Fig. 2.   Fig. 3.
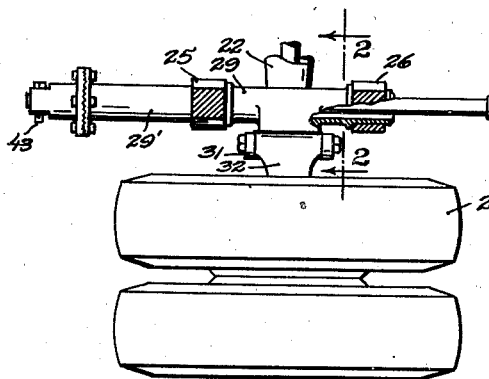
Fig. 1.
INVENTORS:
John G. Holmstrom
Wallace M. Brown
BY
Edward Rowlet
atty.

Feb. 19, 1946.    J. G. HOLMSTROM ET AL    2,395,183
TORSION-ROD SPRINGING OF TANDEM-AXLE VEHICLE
Filed July 24, 1944    3 Sheets-Sheet 3

INVENTORS:
John G. Holmstrom
Wallace M. Brown
BY
atty.

Patented Feb. 19, 1946

2,395,183

UNITED STATES PATENT OFFICE 2,395,183

TORSION-ROD SPRINGING OF TANDEM-AXLE VEHICLES

John G. Holmstrom and Wallace M. Brown, Seattle, Wash., assignors to Kenworth Motor Truck Corporation, Seattle, Wash., a corporation of Washington Application July 24, 1944, Serial No. 546,330

11 Claims. (Cl. 280—104.5)

This invention relates to a tandem rear-axle vehicle of the general character illustrated and described in our United States Letters Patents numbered 2,333,008 and 2,346,164, issued October 26, 1943, and April 11, 1944, respectively, and in our pending application for Letters Patent filed July 26, 1943, Ser. No. 496,238, namely, a vehicle in which torsion springs are employed as the springing agent and which act upon the axles to oppose like-directed oscillatory movements of the latter. In accomplishing such end there is illustrated and described in said issued and pending patents two systems of hooking up the torsion spring to the axles in order that a rotational wind-up may be given to the former by like-directed movements of the latter. One of said systems may be said to constitute a direct and the other an indirect connection, and which is to say that the one system—employing a single torsion rod—accomplishes its intended end by employing two frame-journaled levers one shackled to one and the other to the other axle and by the instrumentality of having these levers point laterally in opposite directions from the rocker axes permits the one lever to be coupled by its hub directly to one end of the torsion rod while the other lever hub is likewise coupled directly to the opposite end of the torsion rod. The other of said systems, employing either one or a severalty of torsion rods, and looking to an arrangement placing the axle-suspending shackles for both of the tandem rear wheels outside the frame to bring these points of suspension relatively close to the wheels, resorts to the use of levers both pointed outwardly from their rocker axes and applies reversing mechanism in the cushion-coupling which extends from the hub of one to the hub of the other said lever.

Both of said systems have their advantages, and it is a principal aim of the present invention to engineer a torsion-rod suspension for tandem rear-axle vehicles having the ruggedness and structural simplicity characteristic of the first-named system and which will accomplish the desirable end peculiar to the second-named system of placing the shackle-links to both tandem rear axles outside the frame. It may be thus said that the present invention expressly pertains to a torsion-rod suspension for tandem rear-axle vehicles in which each of the two tandem rear axles derives its support from a shackle link placed outside the frame, and may be further said to relate to a suspension hook-up confined to the use, at each side of the vehicle, of a single torsion rod or functional equivalent tied directly by one of its ends to one axle-sustaining shackle and by its other end indirectly to the other axle-sustaining shackle, considering—by reference to the torsion rod—that there is comprehended therewith the two main levers which are responsible for giving a rotational wind-up to the same.

The invention consists in the novel construction and in the adaptation and combination of parts hereinafter described and claimed.

In the accompanying drawing we have elected to illustrate three embodiments of a perfected torsion-rod suspension, all having a single rod which is made common to both tandem rear axles and in which upright links employed to shackle the axles to the vehicle's springing suspension are placed, both as respects the forward and the rear axle in tandem, outside the frame and thus in each instance brought into close proximity to the vehicle's running wheels, all three embodiments resorting to the use of mechanical connections, positive in nature, of simple and rugged design, and employing a minimum number of joints and bearings to operatively connect the torsion rod as a spring-couple between one and the other of the said axles.

Identifying the views of said drawing:

Figure 1 is a fragmentary horizontal sectional view taken on a plane lying immediately below the main frame girder and showing one side of a tandem rear-axle vehicle constructed in accordance with what is perhaps the preferred of our three illustrated embodiments.

Figs. 2 and 3 are transverse vertical sections taken to an enlarged scale on lines 2—2 and 3—3, respectively, of Fig. 1.

Fig. 4 is a fragmentary horizontal section on line 4—4 of Fig. 3 detailing the reversing mechanism which is applied to one end of the torsion rod, producing what may be termed an indirect connection tying the rod as a spring-load to one of the tandem rear axles.

Fig. 5 is a fragmentary horizontal section detailing the opposite end of the torsion rod and the tube which, by its connection therewith, directly ties the rod as a spring-load to the other of the tandem rear axles.

Fig. 6 is a detail transverse vertical section on line 6—6 of Fig. 4.

Figure 7:
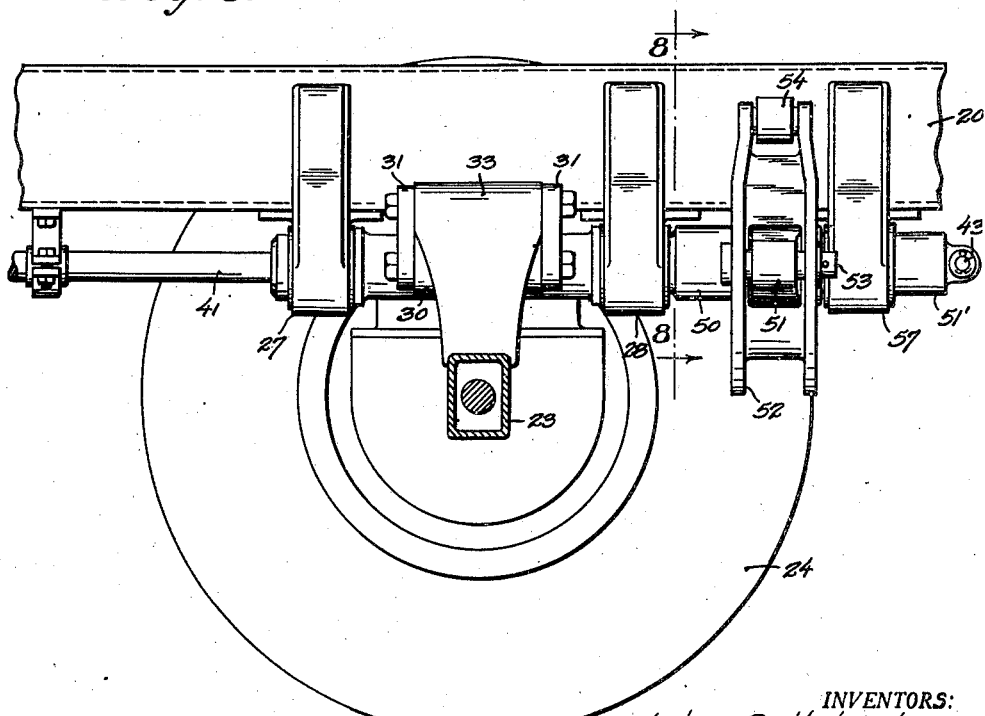

Fig. 7 is a fragmentary longitudinal vertical section showing the second of our illustrated three embodiments or, more especially, only that part of the same necessary to portray the reversing indirect connection between one axle and one end of the torsion rod, the section being taken to traverse the axle at a point adjacent its near extremity and using a scale corresponding to that of Figs. 2 through 6, inclusive.

Figure 8:
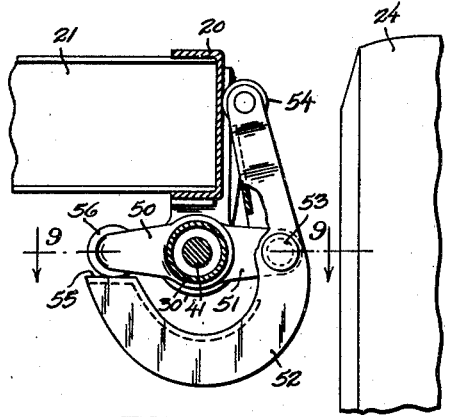

Fig. 8 is a fragmentary transverse vertical section on line 8—8 of Fig. 7.

Figure 9:
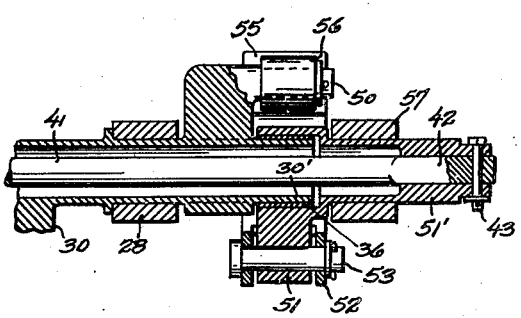

Fig. 9 is a fragmentary horizontal section on line 9—9 of Fig. 8.

Figure 10:
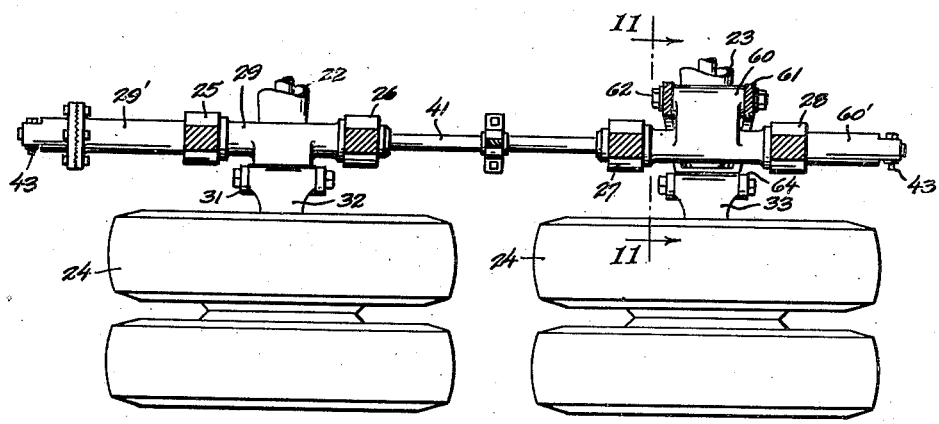

Fig. 10 is a fragmentary horizontal sectional view showing the third of our illustrated three embodiments taken on a section line and employing a scale corresponding to that of Fig. 1.

Figure 11:
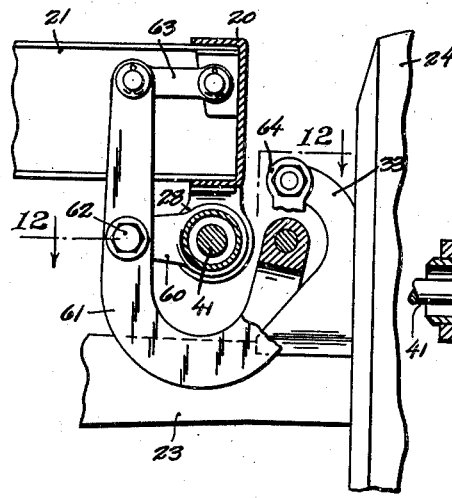
Figure 12:
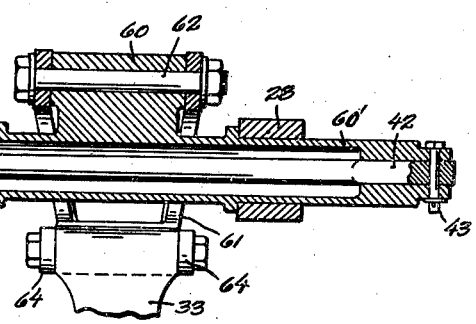

Fig. 11 is a fragmentary transverse vertical section taken to an enlarged scale on line 11—11 of Fig. 10; and Fig. 12 is a fragmentary horizontal sectional view on the jogged line 12—12 of Fig. 11.

Referring to said drawing and employing like numerals throughout all the views where the part in question is of an identical nature, there is indicated a chassis for a tandem rear-axle vehicle providing complementary side girders 20 (only one being shown) tied together by the customary cross-channels 21 and having the usual rear-end running gear comprised of tandem axles 22 and 23, either free-running or driven, and the wheels 24, said axles being of the bodily-movable type holding the revoluble axis of the wheel which is supported at one end in fixed relation to the revoluble axis of the wheel which is supported at the opposite end of a respective said axle.

There are fixed by hangers to said side girders of the frame sets of paired bearings disposed to occupy positions below the girder and one set above one and the other above the other of the tandem rear axles, these bearings being axially aligned and longitudinally spaced as respects the two bearings of each set. The forward set of bearings are designated by 25 and 26, and the rear set by 27 and 28, and received between and journaled for rocker movement in the two bearings of each set is a respective lever, as 29 and 30. It is to be understood that each of these two levers as well as the other parts to be hereinafter described are applied to each side of the vehicle, and which is to say that each part at one side finds its counterpart at the other side. From the fact, however, that said like structures as they are applied to the two sides of the vehicle are entirely independent in their operation other than as oscillatory movement of one end of an axle transmits a modified movement to the opposite end, our description will, for simplicity, be confined to one side only of the vehicle.

First referring to the embodiment illustrated in Figs. 1 through 6, inclusive, and pointing out that the word sketch thereof will apply in part to the other embodiments disclosed, it will be seen that the levers point outwardly in each instance from their journaled hubs—the latter being center-bored—and connect by their free ends, through shackle links 31, with overhanging perches 32 and 33 fixedly mounted one upon one and the other upon the other of the tandem rear axles.

There is formed, as an axial prolongation of the hub of each lever, a tubular extension, as 29' and 30', projected forwardly in one instance and rearwardly in the other instance beyond the outer bearing of each said set, and welded or otherwise fixed to one of these extensions, say the extension 30', to lie in inwardly-spaced relation from the extremity is a lever 35. Fitted over this exposed extremity is a bushing 36, and journaled upon this bushing is another lever 37 produced with a tubular extension 37' extending outwardly as an axial prolongation of the hub. The said levers 35 and 37 point laterally in opposite directions from their rocker axis, and we couple the free end of one to the free end of the other such lever by a yoke 38, shackle links 39 and 40 being applied from the fork-arms of the yoke to effectuate the couple. These links lie perpendicularly, with one extremity of the yoke underlying and the other overlying the related lever arm, and as a means of placing the free ends of the two lever arms in the same transverse vertical plane one of the two levers is given an offset.

The yoke 38 is carried by a floating bar 38' extending transversely from one to the other side of the vehicle and having, upon its opposite end, a like yoke similarly coupled to the corresponding levers which lie at said latter side of the vehicle. Appreciating that the two lever-yoking ends of the bar act independently, it will be apparent, therefor, that the bar acts much in the nature of a radius rod in that, even though both ends are floating, the same are localized.

Denoted by 41 is a single torsion rod which is received through the center-bores of said several levers and their prolongations, and one end of this rod connects with the outer extremity of the prolongation 29' while the other end connects with the prolongation 37', the connection being obtained by flattening the ends of the rod and fitting these flattened ends, as 42, into correspondingly shaped sockets. Pins 43 inserted transversely through the ends of the rod hold the assembly against endwise disarrangement.

Tracing the operation of the described suspension mechanism, it will be apparent that the yoke 38 causes the lever arm 37 to pivot in a direction opposite to that of the lever arm 35, and which is to say that, as one fork-arm of the yoke is drawn upwardly or forced downwardly by rocker action of one of said levers, there is transmitted to the other fork-arm a vertical movement of like direction to rock the other lever in an opposite direction of rotation. Hence, the directive pivoting of the prolongation 37' is opposite to that of the prolongation 30'. This latter prolongation perforce rocks in the same rotary direction as the prolongation 29' under the influence of like-directed oscillatory movements of the two axles, and a spring load is therefor placed upon the axles to resist these like-directed oscillatory movements as the two oppositely acting prolongations 29' and 37' twist the torsion rod and subject the same to a rotational wind-up.

Now proceeding to describe the embodiment illustrated in Figs. 7 through 9, inclusive, the arrangement is much the same in its provision of two axle-connecting levers both pointing outwardly from the rocker axis, and the employment of levers 50 and 51 functionally corresponding to the levers 35 and 37, namely, one fixed for unitary rocker movement with the prolongation 30' and pointing laterally in one direction from the rocker axis while the other is journaled upon a bushing 36, points laterally in the opposite direction, and connects with an end of the torsion rod 41 by a hub prolongation 51'. In this assembly, however, the yoke 38 is replaced by boomerang-shaped tie-member 52 fulcrumed as at 53 intermediate the length of its long arm to the free end of the outwardly pointed lever 51, fitted with a roller 54 at the extremity of this long arm and which said roller finds bearing engagement against and tracks along the exposed face of the frame girder 20, and having its short arm carried under the lever hubs and subjected by a platform end 55 to the depressive thrust of a roller 56 journaled upon the free end of the lever 50. As with the yoke, a downward thrust placed upon the short arm of the boomerang piece draws the long arm downwardly and, through the connection 53 with the other lever 51, causes a rocking action of the latter lever in a direction of rotation opposite to that of the lever 50. It becomes desirable, in this hook-up, to apply an additional bearing, as 57, to resist the lateral thrust to which lever 51 is subjected.

Considering the third embodiment—Figs. 10 through 12, inclusive—only two levers are here employed, the three levers 30, 35 and 37 associated, in the previous embodiments, with one end of the torsion rod 41 being replaced by a single lever 60 which is placed above the axle 23 and disposed to have its free end point inwardly. The hub of this lever, as by a tubular prolongation 60', connects directly with an end of the torsion rod, and the rod's other end is attached in the manner previously described, namely, by the hub prolongation of an outwardly pointed lever shackled to the other axle 22.

Applied to the inwardly pointed lever is a boomerang-shaped piece 61 placed to locate its long arm at the inside and its short arm at the outside of the frame, with connection being had at the mid-length of such long arm, as by a pin 62, with the free end of the lever and at the extremity, as by the link 63, with the frame, the arrangement of the link and the lever arm being that of a parallel linkage. The curving bill of the boomerang is brought under the journaled hub of the lever and locates the extremity of the short arm in underlying relation to the perch 23, and applied to shackle this short arm to the perch are links 64. The operation is thought to be self-evident, like-directed oscillatory movements of the two axles being resisted by the torsion spring due to the boomerang 61 rocking the lever 60 in a direction of rotation opposite to that which is imparted to the lever 29.

Our invention of a perfected mechanical hook-up utilizing levers, as distinguished from and to the exclusion of fluid or gear connections, as a means of picking up oscillatory movements of the axles in tandem and transmitting these movements one axle to one end and the other axle to the other end of a torsion spring common to both axles and in a manner causing the spring's one end to derive a rotative influence converse to that of the spring's other end, is believed to be clear from the foregoing description of three illustrative embodiments. The objection to a fluid or hydraulic system, one of which we portrayed in our above-identified pending application Ser. No. 496,238, primarily lies in the possible development of a leak. As to gearing, applied to perform a reversing office, and which was also illustrated in said pending application as a means of attaining the end in view, such is disadvantageous from the fact that there is but a slight angle through which a torsion rod moves during its rotational wind-up and one or at best a few teeth of the employed intermeshing gears are in consequence continuously subjected to the load stresses. The present invention appears to answer the problem of providing a positive system of reversing leverage essentially characterized in that the number of points at which wear can be expected to take place are reduced to a minimum, and which is to say that the instant embodiments introduce a minimum number of joints in influencing one end of a torsion rod to move counter to the opposite end in response to like-directed oscillatory movements of two axles in tandem each of which is suspended outside the rod's torsional axis.

Departures from the embodiments of the invention which we have elected to illustrate will largely suggest themselves, and no limitations are to be implied from the foregoing description having express reference thereto, it being our intention that all forms of construction and variations in detail coming within the scope of the hereto annexed claims are to be considered as comprehended by the invention.

What we claim is:

1. The structure applied to each side of the frame of a tandem-axle vehicle for springing the frame from the tandem axles, and comprising a pair of co-axial levers supported from the frame for rocker movements about an axis which is generally longitudinal as respects the frame; a torsion rod extending as a cushion-coupling from the hub of one to the hub of the other said lever; a perch for each said axle fixedly related thereto and located, in each instance, outside the rocker axis of the levers; means directly connecting one of the perches to the arm of one lever acting to rock the lever in response to vertical movements of the related axle; a yoke supported for bodily vertical movement and disposed to span the rocker axis of the levers with its two arms located at opposite sides of the torsional axis of the rod; means directly connecting one arm of said yoke to the arm of the other lever; and means operatively interconnecting the other perch to the other arm of the yoke to give to the last-named lever, as the two axles are subjected to forces causing the same to act in a corresponding direction of vertical movement, a rocker movement in a direction of rotation opposite to that given to the first-named lever.

2. The structure applied to each side of a tandem-axle vehicle for springing the vehicle frame from the tandem axles, and comprising a pair of co-axial levers supported from the frame for rocker movements about an axis which is generally longitudinal as respects the frame; a torsion spring extending as a cushion-coupling from the hub of one to the hub of the other said lever; a perch for each said axle fixedly related thereto and located, in each instance, outside the rocker axis of the levers; means directly connecting one of the perches to the arm of one lever for imparting rocking movements to the lever in response to vertical movements of the related axle; a yoke supported for bodily vertical movement and in spanning relation to the rocker axis of the levers to locate one of its arms at one side and the other of its arms at the other side of the torsional axis of the spring; means directly connecting one arm of said yoke to the arm of the other of the two levers; and means tying the other perch to the other arm of the yoke, the arrangement of levers, yoke, and connections serving to give to the levers, as the two axles are subjected to forces causing the same to act in a corresponding direction of vertical movement, rocker movements in opposite directions of rotation.

3. The structure applied to each side of a tandem-axle vehicle for springing the vehicle frame from the tandem axles, and comprising a pair of levers having their arms pointed laterally and supported from the frame for rocker movements about axes which are generally longitudinal as respects the frame; upright links shackling the arm of one of said levers to one of the axles and connecting with the axle at a point outside the rocker axis of the related lever; a yoke supported for bodily vertical movement and disposed to locate one of its arms laterally to one side and the other of its arms laterally to the other side of the journaled hub of the other said lever; upright shackle links for the other of said axles connecting with the axle at a point outside the rocker axis of the last-named lever; connection from the last-named shackle links to one arm of the yoke causing the yoke to move bodily in unison with the related axle; connections from the other arm of the yoke to the arm of the last-named lever, said arrangement of levers, yoke, and connections serving to rock the levers in opposite directions of rotation as the axles are subjected to forces causing the same to act in a corresponding direction of vertical movements; and torsion-spring mechanism applied as a cushion-coupling interconnecting the hubs of the two levers and imposing a spring-load upon the latter resisting oppositely directed rocker movements of the levers.

4. The structure applied to each side of a tandem-axle vehicle for springing the vehicle frame from the tandem axles and comprising, in combination: a pair of levers having their arms each pointed outwardly from the frame and supported by the latter for rocker movements about an axis common to both levers and which is generally longitudinal as respects the frame; connections from the arm of one lever to one of the axles and from the arm of the other lever to the other of the axles serving to impart rocker movements to the levers in response to vertical movements of the axles; a second pair of levers disposed co-axial to the first-named pair and supported by the frame to have one lever point inwardly and the other outwardly from the rocker axis; connection tying one of the last-named levers for unitary rocker movements to one of the first-named levers; torsion-spring mechanism applied as a cushion-coupling interconnecting the other of the first-named to the other of the last-named levers; a yoke supported for bodily vertical movement and disposed to locate one of its arms laterally to one side and the other of its arms laterally to the other side of the rocker axis of the levers; and connections tying one arm of said yoke to the arm of one and the other arm of the yoke to the arm of the other of said last-named levers to cause the last-named levers to rock in opposite directions of rotation and thus, as the first-named levers rock in a like direction of rotation responsive to like-directed vertical movements of the two axles, giving to one end of the torsion-spring mechanism a torsional twist opposite to that given to the other end.

5. The structure applied to each side of a tandem-axle vehicle for springing the vehicle frame from the tandem axles and comprising, in combination: a pair of co-axial levers journaled from the frame for rocker movements about an axis which is generally longitudinal as respects the frame and each pointing outwardly from the rocker axis, one of said levers being formed with an extension projecting as an axial prolongation of the hub; torsion-spring mechanism connected by one of its ends to the hub of the other of said levers; a second pair of levers one of which is fixedly secured to and the other journaled upon said hub prolongation and disposed to have the one lever point inwardly and the other outwardly from the rocker axis; connections from the axles one to one and the other to the other of the two first-named levers operating to rock the latter in like directions of rotation responsive to like-directed vertical movements of the two axles; a yoke supported for bodily vertical movement and disposed to locate one of its arms at one side and the other of its arms at the other side of said rocker axis of the levers; connections tying one arm of said yoke to one and the other arm of the yoke to the other of the two last-named levers whereby rocker movement of the one lever acts through the yoke to rock the other of the two levers in an opposite direction of rotation; and means connecting the other end of the torsion-spring mechanism to the hub of the journaled one of said last-named levers, placing a spring load upon the system of levers, yoke, and connections resisting like-directed vertical movements of the two axles.

6. The structure applied to each side of a tandem-axle vehicle for springing the vehicle frame from the tandem axles and comprising, in combination: a pair of longitudinally spaced levers formed with center-bored hubs journaled at each side of the frame for rocker movements about a common axis which is generally longitudinal as respects the frame, and providing tubular extensions projecting forwardly from the forward lever and rearwardly from the rear lever as axial prolongations of said hubs, one of said levers providing a single lever arm pointing outwardly from the hub into overhanging relation to one of the axles and the other of said levers providing oppositely acting arms one pointing inwardly and the other pointing outwardly, the latter arm into overhanging relation to the other of the two axles; upright links shackling one axle to one and the other axle to the other of said outwardly pointed lever arms; a third lever journaled for rocker movements about an axis coinciding with that of the first two levers and having its arm pointed outwardly; connection from the arm of the last-named lever to the inwardly pointed lever arm operating by rocker movement of the one to rock the other arm in an opposite direction of rotation; and a torsion rod received through said center-bores of the hubs and the tubular prolongations thereof and connecting by one of its ends with the extremity of the prolongation of the single-arm lever and by the other of its ends with the hub of the said third lever to place a spring load upon the system of levers resisting like-directed vertical movements as between the two axles.

7. The structure applied to each side of a tandem-axle vehicle for springing the vehicle frame from the tandem axles and comprising, in combination: a pair of longitudinally spaced levers journaled from the frame for rocker movements about a common axis which is generally longitudinal as respects the frame, one of said levers providing a single lever arm pointing outwardly from the hub and the other of said levers providing oppositely acting arms one pointing outwardly and the other pointing inwardly; connection from one of said axles to one of the outwardly pointed lever arms and from the other axle to the other of the outwardly pointed lever arms functioning by correspondingly directed vertical movements of the two axles to impart, to the related levers, responsive rocker movements which are of like rotative direction; a third lever journaled for rocker movements about an axis coinciding with that of the first two levers and having its arm pointed outwardly; connection from the arm of the last-named lever to the inwardly pointed lever arm operating by rocker movement of the one to rock the other arm in an opposite direction of rotation; and mechanism extending as a cushion-coupling between the hub of the last-named lever and the hub of said single-arm lever arranged and adapted to yieldingly oppose rocking movements of the two levers in opposite directions of rotation.

8. The structure applied to each side of a tandem-axle vehicle for springing the vehicle frame from the tandem axles and comprising, in combination: a pair of longitudinally spaced levers journaled from the frame for rocker movements about a common axis which is generally longitudinal as respects the frame and each having its lever arm pointed outwardly from the hub; connection from one of the axles to one of the lever arms and from the other of the axles to the other of the lever arms functioning by correspondingly directed vertical movements of the axles to impart, to the related levers, responsive rocker movements which are of like rotative direction, one as respects the other said lever; a third lever journaled for rocker movements about an axis coinciding with that of the first two levers; means arranged for bodily vertical movement coupling the third said lever to one of the first-named levers and operating by rocker movement of the one to rock the other of the two coupled levers in an opposite direction of rotation; and mechanism extending as a cushion-coupling between the hub of the third said lever and the other of the first-named levers arranged and adapted to yieldingly oppose rocking movements of the two cushion-coupled levers in opposite directions of rotation.

9. The structure applied to each side of a tandem-axle vehicle for springing the vehicle frame from the tandem axles, comprising a pair of levers each journaled from the frame for rocker movements about axes which are generally longitudinal as respects the frame, and having the arm of one said lever pointed inwardly and the arm of the other said lever pointed outwardly from the journaled hubs; a yoke related to the inwardly pointed lever and supported for bodily vertical movement with one of its arms being located at the outside and the other of its arms at the inside of the rocker axis of the lever; means coupling the outer of said yoke arms to one of the axles and the inner yoke arm to the related lever to cause the arm of the latter lever to move with the axle in a directional travel corresponding to that of the axle; connection from the other axle to the other lever acting to similarly move the arm of the latter in a directional travel corresponding to that of the influencing axle and thus, one lever arm being pointed outwardly and the other inwardly, rocking the two levers in opposite directions of rotation as the two axles are subjected to forces moving the same vertically in a corresponding direction; and mechanism extending as a cushion-coupling from one to the other of said levers arranged and adapted to yieldingly oppose rocker movements of the levers in said opposite directions of rotary twist.

10. The structure applied to each side of the frame of a tandem-axle vehicle for springing the frame from the tandem axles, and comprising a torsion spring supported from the frame for rocker movements about a horizontal axis; a yoke supported for bodily vertical movement and disposed to locate one of its arms at one side and the other of its arms at the other side of said rocker axis of the spring; operative interconnection from one arm of said yoke to one of the axles causing the yoke to move in its said bodily vertical movement relatively in unison with the said axle; and operative interconnection from the other arm of the yoke to one end of the torsion spring and from the other end of the torsion spring to the other of the two axles arranged and adapted to develop a torsional wind-up of the spring in response to correspondingly directed vertical movements of the two axles.

11. The structure applied to each side of the frame of a tandem-axle vehicle for springing the frame from the tandem axles, and comprising a pair of levers supported from the frame for rocker movements about axes generally longitudinal as respects the frame; means connecting one of the axles to one of the levers acting to rock the related lever in response to vertical movements of the related axle; a yoke supported for bodily vertical movement and disposed to span the rocker axis of the other lever to locate one arm of the yoke laterally to one side and the other arm of the yoke laterally to the other side of the said axis; means operatively interconnecting one arm of said yoke to the lever last mentioned; means operatively interconnecting the other arm of the yoke to the other axle causing the yoke to move in its said bodily vertical movement relatively in unison with the axle to which connected; and torsion spring mechanism applied as a cushion-coupling operatively interconnecting the hubs of the two levers and imposing a spring load upon the latter in response to correspondingly directed vertical movements of the two axles.

JOHN G. HOLMSTROM.
WALLACE M. BROWN.